(12) United States Patent
Renner

(10) Patent No.: US 7,127,303 B2
(45) Date of Patent: Oct. 24, 2006

(54) SYSTEM FOR AUTOMATING, MONITORING AND CONTROLLING TECHNICAL PROCESSES AND ACQUIRING MEASUREMENTS THEREOF

(76) Inventor: Peter Renner, Heiligenstock 2 D - 51515, Kürten (DE)

( * ) Notice: Subject to any disclaimer, the term of this patent is extended or adjusted under 35 U.S.C. 154(b) by 552 days.

(21) Appl. No.: 10/613,171

(22) Filed: Jul. 3, 2003

(65) Prior Publication Data

US 2004/0059440 A1 Mar. 25, 2004

(30) Foreign Application Priority Data

Aug. 5, 2002 (EP) .................................. 02017453

(51) Int. Cl.
- G05B 11/01 (2006.01)
- G05B 19/18 (2006.01)
- G05B 19/42 (2006.01)
- G05B 23/02 (2006.01)
- G06F 19/00 (2006.01)
- G06F 15/173 (2006.01)

(52) U.S. Cl. .............................. 700/19; 700/9; 700/20; 700/86; 700/96; 702/187; 702/188; 709/208; 709/224; 709/225; 709/226; 340/3.1; 340/3.9

(58) Field of Classification Search .............. 700/9–11, 700/17–20, 65, 83, 86, 95–97; 702/187, 702/188; 709/208–210, 217, 218, 223–225; 340/3.1, 3.9

See application file for complete search history.

(56) References Cited

U.S. PATENT DOCUMENTS

| | | | |
|---|---|---|---|
| 3,866,173 A * | 2/1975 | Moorman et al. ......... 340/5.54 |
| 5,455,911 A * | 10/1995 | Johansson .................... 710/44 |
| 5,517,404 A * | 5/1996 | Biber et al. ..................... 700/9 |
| 5,878,040 A | 3/1999 | Peirce ......................... 370/389 |
| 5,913,028 A | 6/1999 | Wang .......................... 709/203 |
| 5,918,020 A | 6/1999 | Blackard ..................... 709/228 |
| 6,157,649 A | 12/2000 | Peirce ......................... 370/401 |
| 6,298,377 B1 | 10/2001 | Hartikainen ................ 709/223 |
| 6,317,701 B1 | 11/2001 | Pyotsia et al. .............. 702/188 |
| 6,321,272 B1 | 11/2001 | Swales ....................... 709/250 |
| 6,325,198 B1 * | 12/2001 | Pattantyus-Abraham et al. ....................... 198/339.1 |
| 6,343,083 B1 | 1/2002 | Mendelson. ................ 370/466 |
| 6,370,448 B1 | 4/2002 | Eryurek ...................... 700/282 |

(Continued)

FOREIGN PATENT DOCUMENTS

EP 68482 A1 * 1/1983

(Continued)

OTHER PUBLICATIONS

Automatisierungstechnik; p. 20-21 Data Flow Conditioned in Structured Form—From Industrial Bus to Database and p. 22 Process Instrumentation and Control System: Keeping up With the Times (Heft Jul. 1997, etz) (Translation Attached).

(Continued)

*Primary Examiner*—Crystal J. Barnes
(74) *Attorney, Agent, or Firm*—Charles L. Schwab; Nexsen Pruet, LLC

(57) ABSTRACT

A system for automation, monitoring and measurement acquisition for technical processes, having measurement and control units (2, 14, 15, 16) that are connected to sensors and actuators of the processes (1, 8, 9, 10) via measurement and control lines (3, 11, 12, 13), having a system distributed in a data network (4), in which system automation modules (44, 45, 46) are combined into automation units (39, 31, 32, 18, 19) and automation units are combined into automation groups (99), and having a higher-level information plane (22) whose information programs (23 to 27) have reading access to the automation units.

14 Claims, 9 Drawing Sheets

U.S. PATENT DOCUMENTS

| | | |
|---|---|---|
| 6,397,114 B1 | 5/2002 | Eryurek ....................... 700/51 |
| 6,438,534 B1 * | 8/2002 | Sorgel ......................... 706/61 |
| 6,532,392 B1 | 3/2003 | Eryurek ....................... 700/54 |
| 6,615,091 B1 * | 9/2003 | Birchenough et al. ........ 700/96 |
| 6,754,721 B1 * | 6/2004 | Heckel .......................... 710/4 |
| 6,772,033 B1 * | 8/2004 | Scherer et al. .............. 700/115 |
| 6,891,838 B1 * | 5/2005 | Petite et al. ................ 370/401 |
| 6,957,110 B1 * | 10/2005 | Wewalaarachchi et al. ... 700/86 |
| 7,035,773 B1 * | 4/2006 | Keyes et al. ................ 702/188 |
| 2002/0046290 A1 * | 4/2002 | Andersson et al. ......... 709/237 |
| 2002/0131454 A1 * | 9/2002 | Franke et al. ............... 370/503 |
| 2003/0033036 A1 * | 2/2003 | Wendorff ..................... 700/79 |
| 2005/0154809 A1 * | 7/2005 | Becker et al. .............. 710/104 |

FOREIGN PATENT DOCUMENTS

| | | |
|---|---|---|
| EP | 0413044 | 8/1989 |
| EP | 825502 A1 * | 2/1998 |

OTHER PUBLICATIONS

The Design of Distributed Measurement on IEEE 1451 Standards and Distributed Time Services, Burch et al., pp. 529-534.

* cited by examiner

SYSTEM FOR AUTOMATING, MONITORING AND CONTROLLING TECHNICAL PROCESSES AND ACQUIRING MEASUREMENTS THEREOF

TECHNICAL FIELD

This invention relates to an automation system for controlling a technical process through use of sensors, actuators and control lines connected to control units.

BACKGROUND OF THE INVENTION

It is known to provide, between the processes and data-processing devices (PCs), one or a plurality of measurement and control units. These are connected to sensors and actuators of the process via measurement and control lines. Additionally, an interface can be provided to one or a plurality of PCs on which the governing software is installed. The measurement and control units can also be designed as boards integrated into the PCs. Such measurement and control units can also be designed as field devices or plug-in modules that are mounted in control cabinets or directly on machines.

If a data network is used as interface, the governing software can be installed on a plurality of PCs so that powerful systems with distributed intelligence are made possible.

Conventional systems offer no perceptible structure. Each individual automation module, whether it is an automation module, monitoring module or measurement acquisition module, is an island solution within an enterprise and offers no link to complex department-wide or enterprise-wide information systems.

OBJECTS AND SUMMARY OF THE INVENTION

It is an object of the invention to remedy the beforementioned shortcomings and create the prerequisites for a department-wide or company-wide information system.

In a data network, automation modules are combined into automation units, each automation module having available its own program code and being executable independently of the other automation modules.

The core is the individual automation module, whose task is to perform a self-contained automation task. For example, a number of identical test stands can be automated by one automation unit, an automation module being allocated to each test stand. All experiments required for the optimization of a product can also be bundled in one automation unit in a chemical laboratory.

It is important that the several automation modules of an automation unit are executable independently of one another. It is desirable that each automation module have available its own program code.

In further development of the invention, automation units can be combined into an automation group, each automation unit having available its own program code and being executable independently of the other automation units. Experiments on the optimization of many products of an enterprise, for example, can be bundled in such automation groups. Such automation groups can also be subinstallations of an overall installation. Here too it is desirable that each automation group has available its own encapsulated program code.

In development of the invention, there can be an arbitrary number of automation groups that are in principle executable independently of one another.

In further development of the invention, there is an information level that represents the totality of information programs for placing the individual automation units and automation groups in a larger relationship.

These programs have reading access to the individual automation units. The information programs can be variously configured. For example, a department manager will receive only reading access to those automation groups that fall within his area of responsibility. To a plant manager, in contrast, all automation groups of his plant will be accessible.

In a further development of the invention, the individual automation units are structured into three planes. Into an uppermost plane called the supervisory plane, a middle plane called the plane of automation modules, and a lowermost plane called the report plane.

The task of the supervisory program of the supervisory plane is to set up new automation units and automation modules and to start and stop the automation modules in its automation unit. Further, the supervisory program of the supervisory plane supplies items of information about the status of the individual automation modules. "Status" means items of information such as automation module started, stopped, idle or interrupted.

The supervisory programs of the supervisory planes are provided for specialists who are entrusted with the processes. They receive a summary of the status of the individual processes. On the screen of the supervisory program of the supervisory plane there are symbolic figures that represent synonyms for the individual automation modules. The markings of the symbolic figures indicate whether the associated automation modules are currently running or in the idle state. Further items of information about the status of the individual automation modules can be displayed by color-coding and text windowing.

In the plane of automation modules, the several automation modules can be developed and executed independently of one another. This is made possible by the fact that each automation module has available its own program code. An arbitrary number of reports can be developed and executed independently of one another in the report plane. This is made possible by the fact that each report has available its own program code. A report can be allocated to the individual automation module. From the corresponding automation module, the report receives data that are output in the format of the report.

In further development of the invention, it is proposed that the supervisory program with supervisory plane have available a development mode and a runtime mode. Further automation modules can be set up in a development mode. When a new automation module is set up, a further symbolic figure allocated to the added automation module is set up on the screen surface. This leads to a further complete program code being set up for this automation module in the automation unit.

Each automation module of the plane of automation modules has available a development mode and a runtime mode. The individual automation modules are configured or developed in development mode. The runtime mode serves for the normal operation of the automation modules such as for example the automated sequence of a process.

Each report of the report plane has available a development mode and a runtime mode. The formats of the individual reports are developed in development mode. This is accomplished by setting up fields. These fields are written with data by the corresponding automation module at runtime.

In further development of the invention, the individual automation modules are structured in three planes.

The upper plane, called the modular operation and observation plane, serves as the user interface. The graphical representations contain process visualization objects. These process visualization objects can be installed and provided with properties in development mode. Such process visualization objects are virtual buttons, switches, indicating devices and much more. The user can operate and observe the process at runtime with the aid of these objects.

The middle plane, called the procedure plane, contains the procedure screens of the automation module. The procedure screens contain graphical symbols called procedures as synonyms for program modules of the automation module. In development mode, the procedures that contain the program code are set up. In runtime mode, according to the invention, those procedures currently functioning are marked in the procedure screen.

The lower plane, called the script plane, contains the program code in the script window. In the script window, a user can develop the automation program for controlling the underlying technical process. The program code is developed in a procedure-based fashion. The script window is reached by clicking on the corresponding symbolic figure of the procedure. The program code of the procedure can now be developed in the script window.

A further inventive feature is a channel table that serves as a transit area for process data. "Process data" means analog and digital signals. On the one hand, such signals are continually written into the channel table from the processes via the measurement and control unit of the interface, and are now available to the automation modules. On the other hand, the automation modules produce control signals that are written into the channel table and forwarded to the processes in order to bring about desired changes there.

In a further development of the invention, a time stamp can be appended to analog process variables such as for example temperatures, pressures, flow rates, which are acquired by the measurement and control unit via sensors, so that the time of occurrence of the measurement signal can be determined at a later time.

The same procedure can be applied to digital signals, for example when a machine is turned on or turned off. In this case, exactly this time, also called the edge change, is time stamped. The time stamp can be configured in a variety of ways. It can contain date and time, time only, or a relative time.

In further development of the invention, there is a format table. This serves as a data interface between the script of an automation module and its associated report. In the development mode of the report, the report is developed as a format. Format fields are defined in the report into which data are written during runtime. According to the invention, the report simultaneously structures the format table, fields being set up in the format table analogously to the format fields. At runtime, the fields of the format table serve as data interface between the script of the automation module and its corresponding report.

BRIEF DESCRIPTION OF THE DRAWINGS

For the further explanation of the invention, reference is made to the simplified depictions of exemplary embodiments in the drawings, in which.

DETAILED DESCRIPTION OF THE INVENTION

Figure 1:
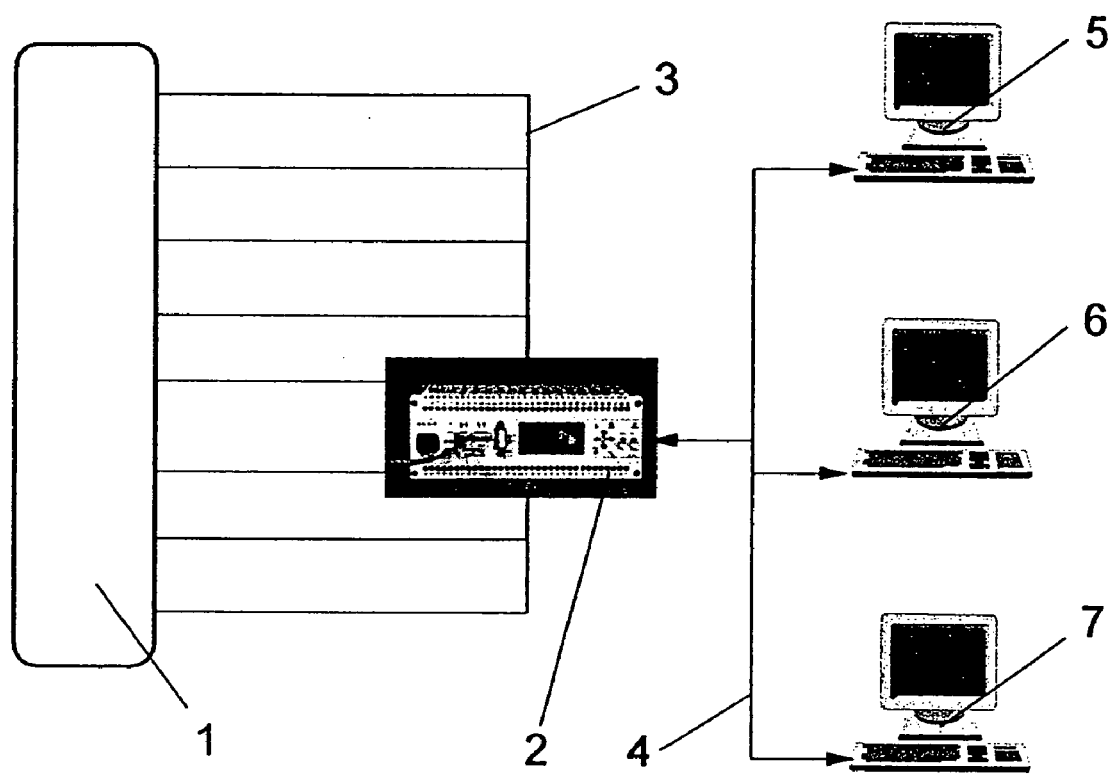
FIG. 1 shows the structure of an entire system with a process to be automated, the measurement and control unit, and the PCs on which the software is installed.

In FIG. 1, the reference characters have the following meanings. 1 is a process to be automated. 2 is a measurement and control unit. 3 are lines between the sensors and actuators of the process 1 and the measurement and control unit 2. 4 is a data network as a data link between the measurement and control unit 2 and the PCs 5, 6 and 7 on which the measurement and control software is installed.

The system of FIG. 1 functions as follows. The measurement and control unit 2 serves as interface between a process 1 that is being monitored or automated. In the process 1 there are sensors and actuators, which are connected to a measurement and control unit 2 via connecting lines 3. The measurement and control unit 2 is in turn connected to the PCs 5, 6, 7 via a data network 4. In this way, analog and digital signals of the sensors can be conducted to the PCs 6, 7, 8. The software of the PCs 6, 7, 8 produce control commands, which are conveyed over the same route to the actuators of the process 1.

Figure 2:
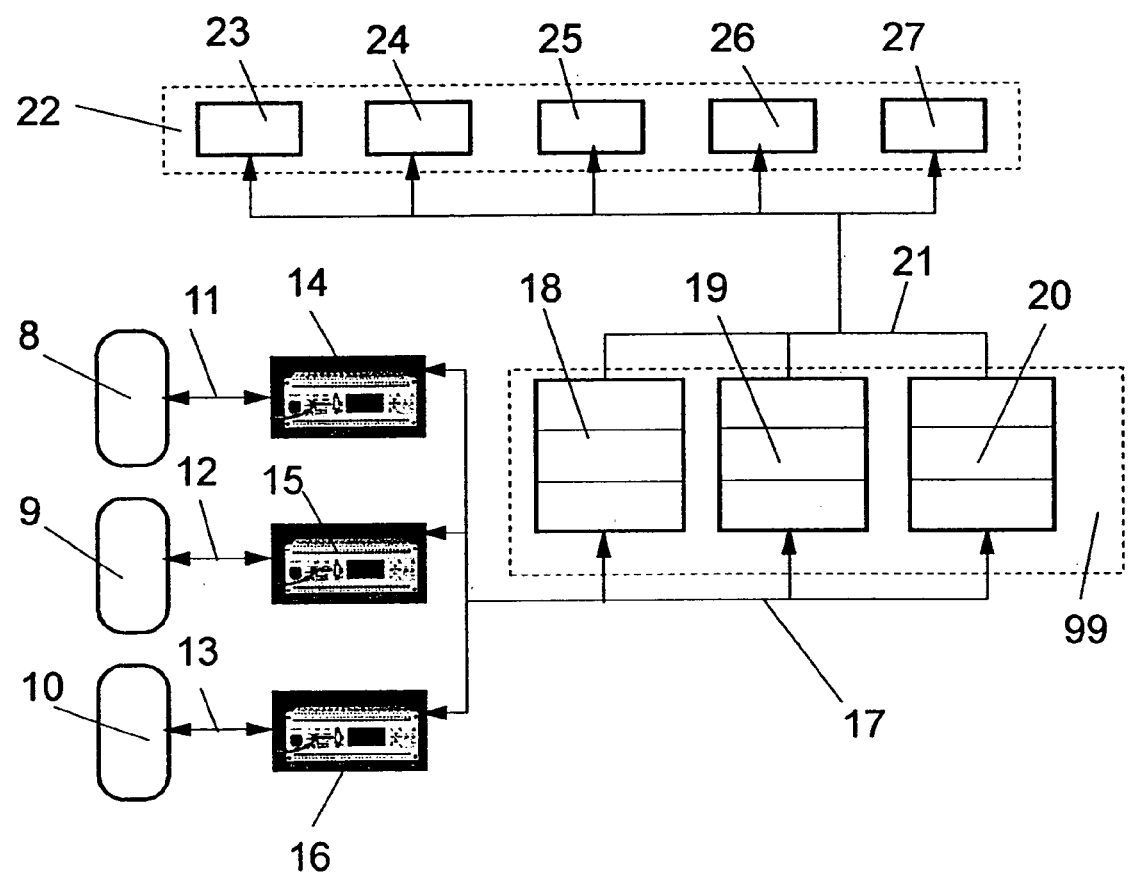
FIG. 2 shows the structure of the entire system as a block diagram with three processes, three measurement and control units, one information level with information programs, and one automation group with three automation units.

In FIG. 2, the reference characters have the following meanings. 8, 9 and 10 are processes to be automated. 11, 12 and 13 are lines between the sensors and actuators of the processes and the terminals of the measurement and control units. 14, 15 and 16 are measurement and control units. 17 is a data network as data link between the measurement and control units and the PCs. 18, 19 and 20 are automation units, which are structured in three planes and contain automation modules. 21 is a data network as a data link between the automation units and the information programs. 22 is an information level that contains the information programs 23, 24, 25, 26 and 27. 99 is an automation group that includes the automation units 18, 19 and 20.

The measurement and control units 14, 15, 16 serve as interface between processes 8, 9, 10 that are meant to be monitored or automated. In processes 8, 9, 10 there are sensors and actuators that are connected to measurement and control units 14, 15, 16 via connecting lines 11, 12, 13. The measurement and control units 14, 15, 16 are in turn connected via the data network 17 to the PCs in which the automation units 18, 19, 20 are installed. In this way, the analog and digital signals of the sensors can be conducted to the automation modules in the automation units 18, 19, 20. The automation modules in the automation units 18, 19, 20 produce control commands, which are conveyed over the same route to the actuators of the processes 8, 9, 10. This insures that the processes 8, 9, 10 are controlled in the desired fashion. The PCs, on which the automation units 18, 19, 20 are installed, are connected via a data network 21 to the various PCs on which the information programs 23, 24, 25, 26, 27 run. The information programs 23 to 27 can serve to provide information to higher organizational levels. All interested parties, if they are authorized, can now exercise reading access to the automation units 18, 19, 20 and can get status information down to the plane of the automation modules 34, 37 and the report plane 35, 38 shown in FIG. 3.

The individual information programs 23 to 27 can be configured differently, so that it is possible to look into only those automation units 18, 19, 20 that are relevant to the corresponding party. In this way, for example, a department manager will be able to look into only the automation units that fall within his area of responsibility. Higher management levels will possibly be permitted to look into a larger number of automation units. Information programs 23 to 27 are combined in an information level 22. Automation units 18, 19, 20 are combined in an automation group 99.

Figure 3:
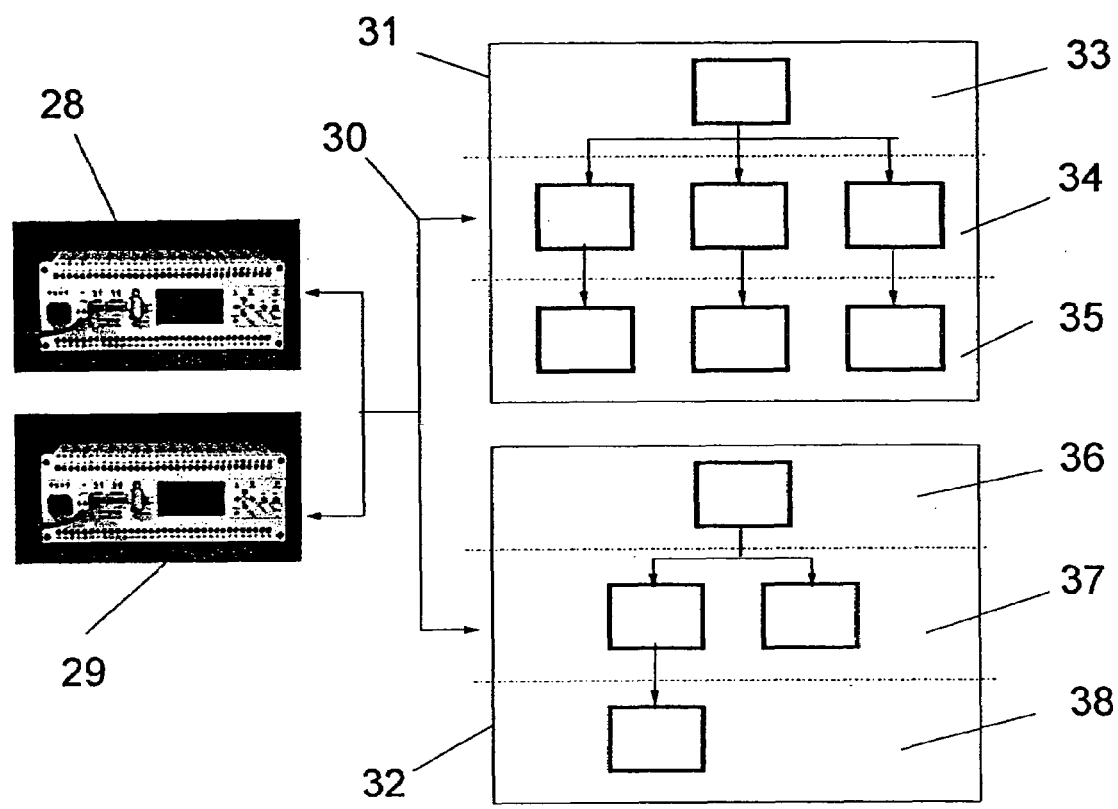
FIG. 3 shows a block diagram as a partial aspect of the entire system with two measurement and control units, two automation units in which the three levels of the individual automation units are depicted.

In FIG. 3, the reference characters have the following meanings. 28 and 29 are measurement and control units. 30 is a data network. 31 and 32 are automation units. 33 is a supervisory plane in an automation unit. 34 is a plane of automation modules in an automation unit. 35 is a report plane in an automation unit. 36 is a supervisory plane in a further automation unit. 37 is a plane of automation modules in a further automation unit. 38 is a report plane in a further automation unit.

As shown in FIG. 3, the measurement and control units 28, 29 are connected via the data network 30 to the PCs in which the automation units 31, 32 are installed. In this way, analog and digital signals of the sensors of the processes can be transmitted to the automation modules in the automation units 31, 32. The automation modules of the planes of the automation modules 34, 37 in the automation units 31, 32 produce control commands, which are conveyed over the same route to the actuators of the processes. This makes sure that the processes can be controlled in the desired fashion.

The automation units 31, 32 are subdivided into individual planes, each plane performing specific tasks. The upper plane, the supervisory plane 33 or 36, has the task of enabling the user to survey the automation modules that are positioned in the plane of the automation modules 34, 37. One task of the supervisory planes 33, 36 is to set up new automation units 31, 32 and automation modules of the plane of the automation modules 34, 37 and to start and stop the automation modules in these automation units. Further, the supervisory planes 33, 36 deliver items of information about the status of the individual automation modules. "Status" means such items of information as automation module started, stopped, idle, interrupted.

The various automation modules are positioned in the middle plane, called plane of the automation modules 34, 37. Automation modules can perform automation, monitoring or measurement acquisition tasks. The various automation modules can be developed and executed independently of one another in the plane of the automation modules 34, 37. This is made possible by the fact that each automation module has available its own encapsulated program code.

The reports are positioned in the lower plane, called report planes 35, 38. An arbitrary number of reports can be developed and executed independently of one another. This is made possible by the fact that each report has available its own program code. A report can be allocated to the individual automation modules. From the corresponding automation module, the report receives data that can be output in the format of the report.

Figure 4:
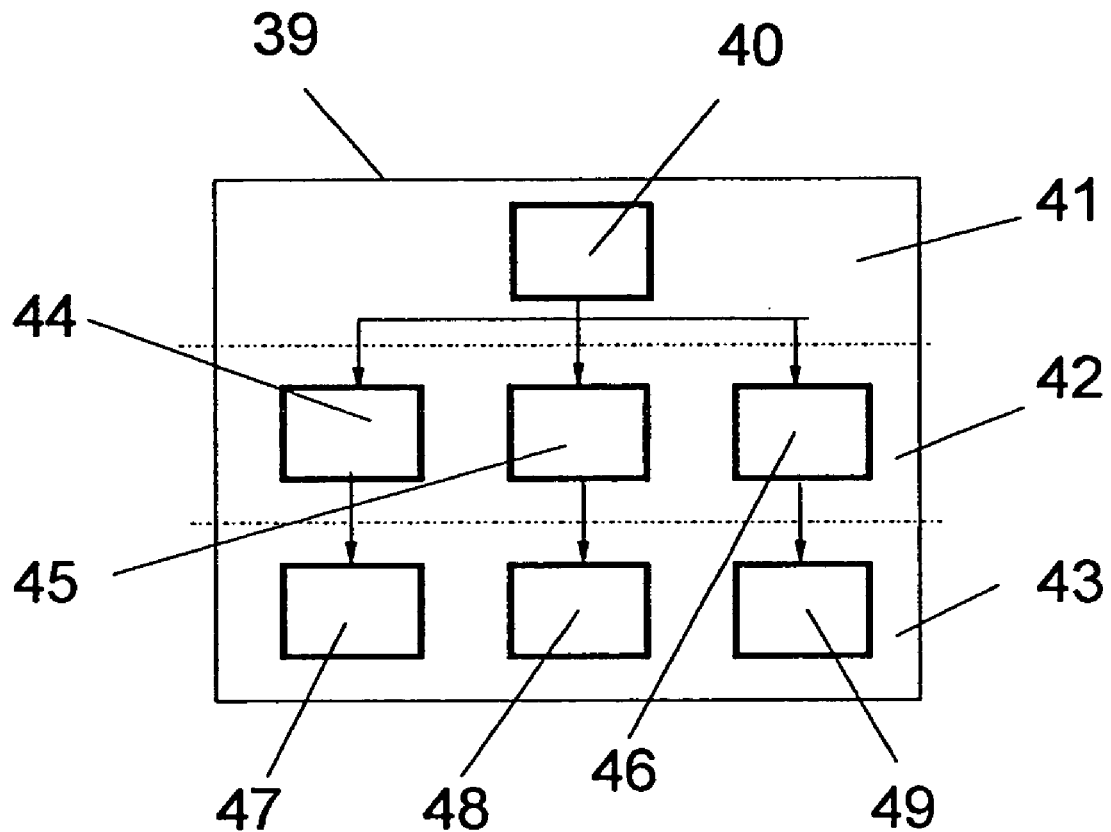
FIG. 4 shows the block diagram of an automation unit in which the three planes are depicted, three automation modules and three reports being depicted in the procedure plane and in the report plane, respectively.

In FIG. 4, the reference characters have the following meanings. 39 is an automation unit. 40 is a supervisory program. 41 is a supervisory plane. 42 is a plane of automation modules. 43 is a report plane. 44, 45 and 46 are automation modules. 47, 48 and 49 are reports.

As shown in FIG. 4, the automation unit 39 is subdivided into individual planes, each plane performing specific tasks. The supervisory program 40 of the supervisory plane 41 has the task of enabling the user to have a general view of the automation modules 44, 45, 46, which are positioned in the plane of the automation modules 42. One task of the supervisory program 40 is to set up new automation units 39 and automation modules 44, 45, 46 and to start and stop the automation modules 44, 45, 46 in automation unit 39. Further, the supervisory program 40 delivers items of information about the status of the individual automation modules 44, 45, 46. "Status" means such items of information as the automation modules 44, 45 and 46 are started, stopped, idle, interrupted.

The various automation modules 44, 45, 46 are positioned in the plane of the automation modules 42. The automation modules 44, 45, 46 can perform automation, monitoring or measurement acquisition tasks. Various automation modules 44, 45, 46 can be developed and executed independently of one another in the plane of automation modules 42. This is made possible by the fact that each automation module 44, 45, 46 has available its own program code.

The reports 47, 48, 49 are positioned in the report plane 43. An arbitrary number of reports 47, 48, 49 can be developed and executed independently of one another. This is made possible by the fact that each report 47, 48, 49 has available its own program code. The reports 47, 48, 49 can be allocated to individual automation modules 44, 45, 46. From the corresponding automation modules 44, 45, 46, the reports 47, 48, 49 receive data that can be output in the format of the reports 47, 48, 49.

Figure 5:
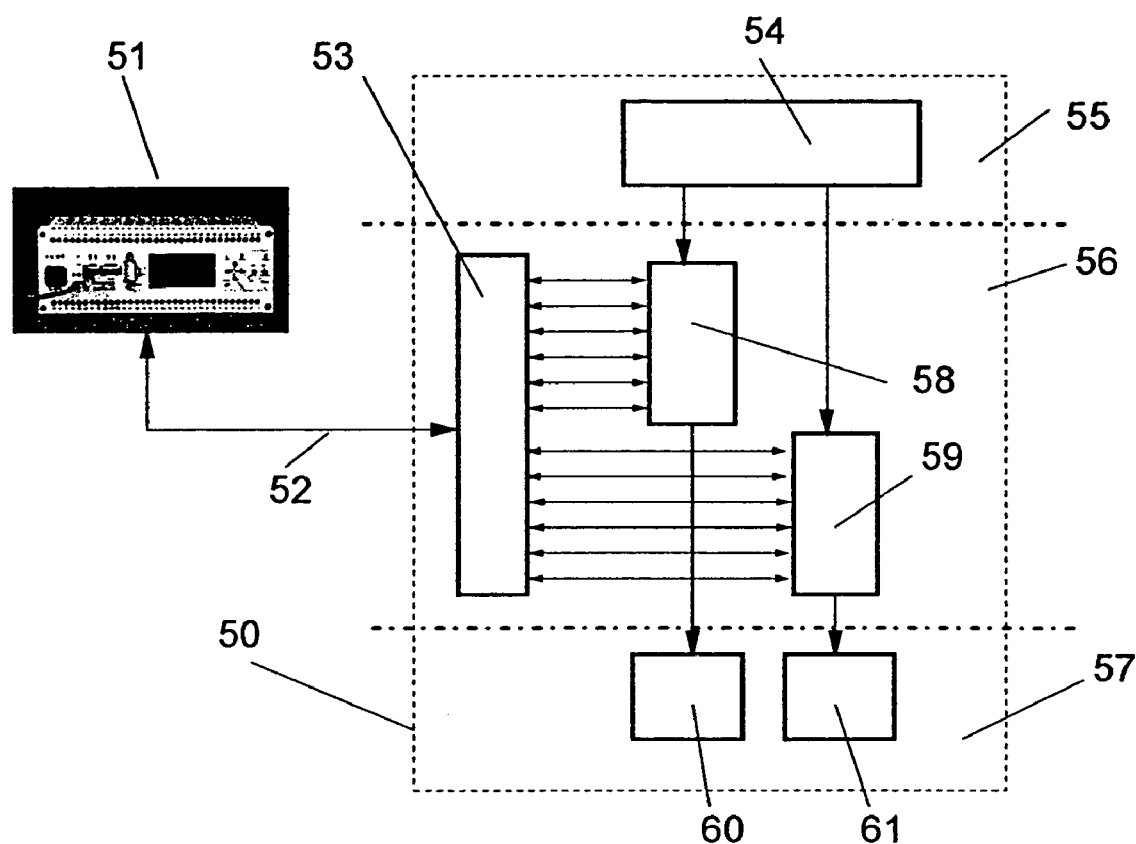
FIG. 5 shows the block diagram of an automation unit and of a measurement and control unit and the interchange of data between the measurement and control unit and two automation modules via channel table.

In FIG. 5, the reference characters have the following meanings. 50 is an automation unit. 51 is a measurement and control unit. 52 is a data network. 53 is a channel table. 54 is a supervisory program. 55 is a supervisory plane of the automation unit. 56 is a plane of automation modules in the automation unit. 57 is a report plane in the automation unit. 58 and 59 are automation modules in the automation unit. 60 and 61 are reports in the automation unit.

The measurement and control unit 51 is connected via the data network 52 to the PC in which the automation unit 50 is installed.

The channel table 53 serves as a transit area for process data. In this way, analog and digital signals of the sensors of the processes can be conducted to the automation modules 58, 59 with the mediation of the channel table 53. The automation modules 58, 59 in the automation unit 50 produce control commands, which are conveyed over the same route in the opposite direction to the actuators of the processes. This makes sure that the processes are controlled in the desired fashion.

"Analog signals" means process variables such as temperatures, pressures, flow rates, velocities, rotation speeds and the like. Digital signals can be states of machines and installations. Process variables are often stored with a time stamp in the fields of the channel table 53, so that the time of occurrence of such signals can be recovered at a later time.

The automation unit 50 is subdivided into individual planes 55, 56, 57, each plane performing specific tasks.

The supervisory program 54 of the supervisory plane 55 has the task of giving the user a general view of the automation modules 58, 59, which are positioned in the plane of the automation modules 56. One task of the supervisory program 54 of the supervisory plane 55 is to set up further automation units 50 and automation modules 58, 59 and to start and stop the automation modules 58, 59 in the automation unit 50. Further, the supervisory program 54 delivers items of information about the status of the individual automation modules 58, 59. "Status" means such items of information as automation modules 58, 59 started, stopped, idle, interrupted.

The reports 60, 61 are positioned in the report plane 57. An arbitrary number of reports 60, 61 can be developed and executed independently of one another. This is made possible by the fact that each report 60, 61 has available its own program code. A report 60, 61 can be allocated to each individual automation module 58, 59. From the corresponding automation modules 58, 59, the reports 60, 61 receive data that are output in the format of report 60, 61.

Figure 6:
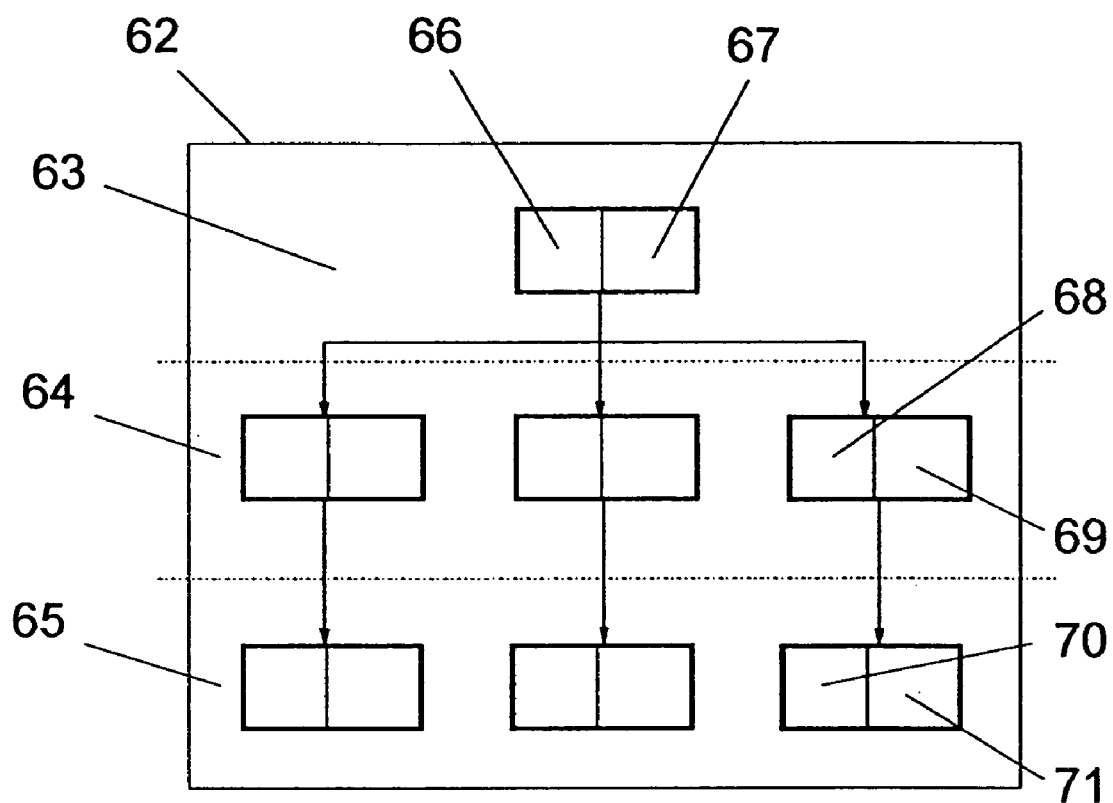
FIG. 6 shows the block diagram of an automation unit with its three planes, the supervisory program, three automation modules and three reports being depicted as blocks in the planes, and all blocks that depict the development mode and the runtime mode being divided in two.

In FIG. 6, the reference characters have the following meanings. 62 is an automation unit. 63 is a supervisory plane. 64 is a plane of automation modules. 65 is a report plane. 66 and 67 are supervisory programs. 68 and 69 are automation modules. 70 and 71 are reports.

The automation unit 62 is subdivided into the individual planes 63, 64, 65, each plane 63, 64, 65 performing specific tasks. Plane 63 is a supervisory plane containing a supervisory program, which is made up of parts 66, 67. Part 66, the supervisory program of plane 63, is the development mode which permits further automation units 62 and further automation modules within the automation unit to be set up.

Part 67 of the supervisory program is the runtime mode permitting automation modules of the plane of the automation modules 64 to be started and stopped. In addition, the part 67 of the supervisory program gives out items of information about the status of the individual automation modules of plane of the automation modules 64. "Status" means such items of information as automation module started, stopped, idle, interrupted.

The plane of the automation modules 64 contains the automation modules, which are made up of parts 68, 69. The automation modules with the parts 68, 69 can perform automation, monitoring or measurement acquisition tasks. Part 68 of the automation modules 64 is the development mode by which the automation module can be developed. Part 69 of the automation module is the runtime mode by which the automation module can be executed independently of the other automation modules.

The report plane 66 contains reports, which are made up of parts 70, 71. Part 70 of the report is the development mode by which the report can be developed. Part 71 of the report is the runtime mode by which the report can be executed independently of the other reports. A report is permanently coupled with a corresponding automation module. When an automation module is started, the corresponding report is also started.

Figure 7:
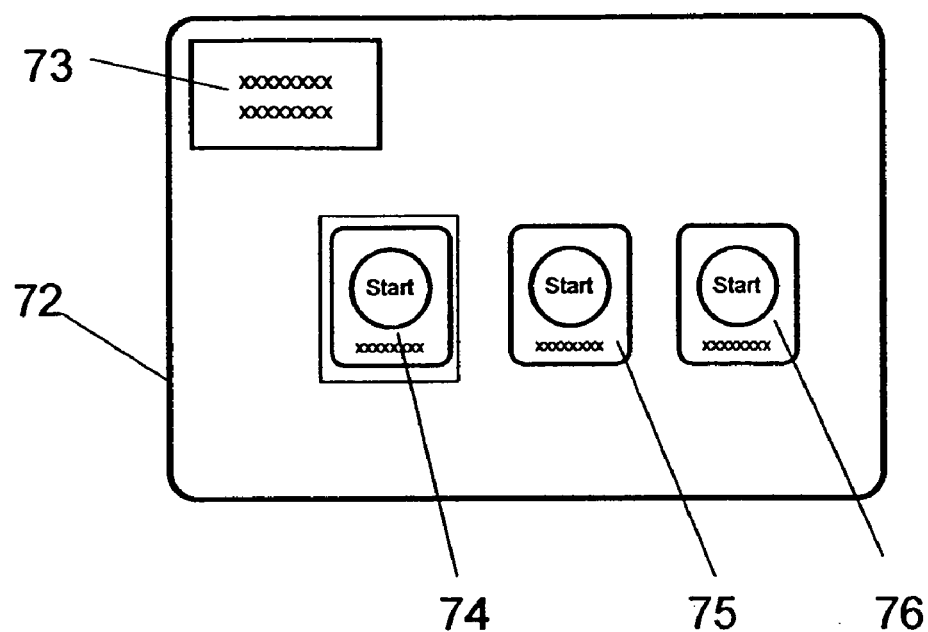
FIG. 7 shows the screen of the supervisory program of the supervisory plane of an automation unit in development mode.

In figure 7, the reference characters have the following meanings. 72 is a screen of the development mode of a supervisory program. 73 is a list of the automation modules set up. 74, 75 and 76 are graphical symbols of the automation modules. The screen 72 shows the development mode of the supervisory program of an automation unit. On the screen 72 are graphic symbols 74, 75, 76, which represent synonyms for the installed automation modules. The screen 72 serves for the setup or removal of further automation modules. A list of automation modules 73 is provided for the setting up of the automation modules. An automation module is pulled in simple fashion from a list of the automation modules 73 to the free area of the screen. Then a further graphic symbols such as the figures 74, 75, 76 of the new automation module opens. After a unique name is specified for the new automation module, this automation module is permanently installed. If an automation module is currently being worked on in the sense of program development, the graphical symbol 74 of the automation module 74 is marked.

Figure 8:
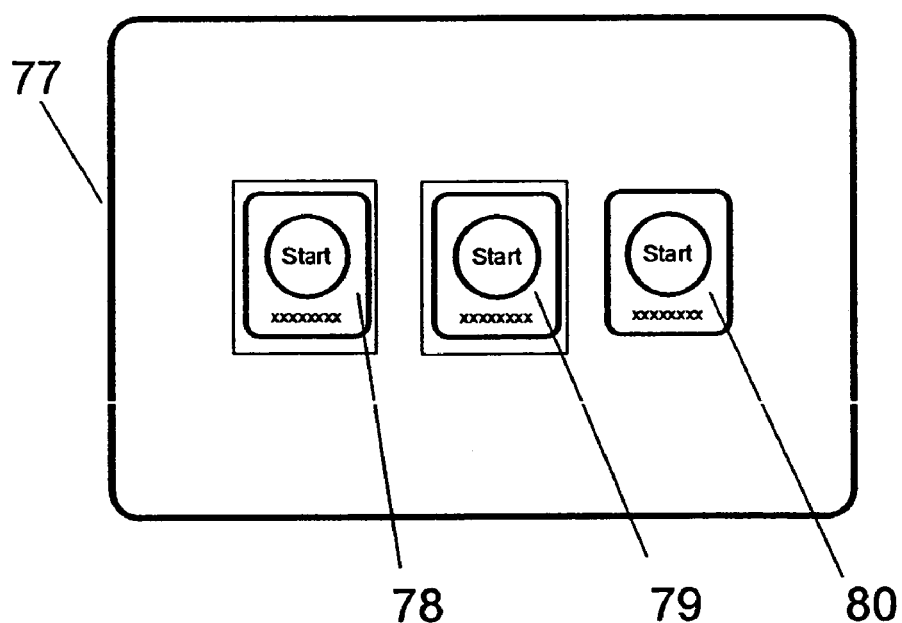
FIG. 8 shows the screen of the supervisory program of the supervisory plane of an automation unit in runtime mode.

In figure 8, the reference characters have the following meanings. 77 is a screen of the runtime mode of a supervisory program. 78, 79 and 80 are graphical symbols of the automation modules. The screen 77 shows the runtime mode of the supervisory program of an automation unit. On the screen 77 are the graphic symbols 78, 79, 80, which represent synonyms for individual automation modules. The screen 77 makes it possible to observe the status of individual automation modules during runtime. The graphic symbols 78, 79 are marked. They indicate that the associated automation modules are currently being executed. The automation module 80 (not marked), in contrast, is in the idle state. Further items of information about the status of the individual automation modules can be displayed through color-coding of the graphic symbols 78, 79, 80 and/or by text windowing.

Figure 9:
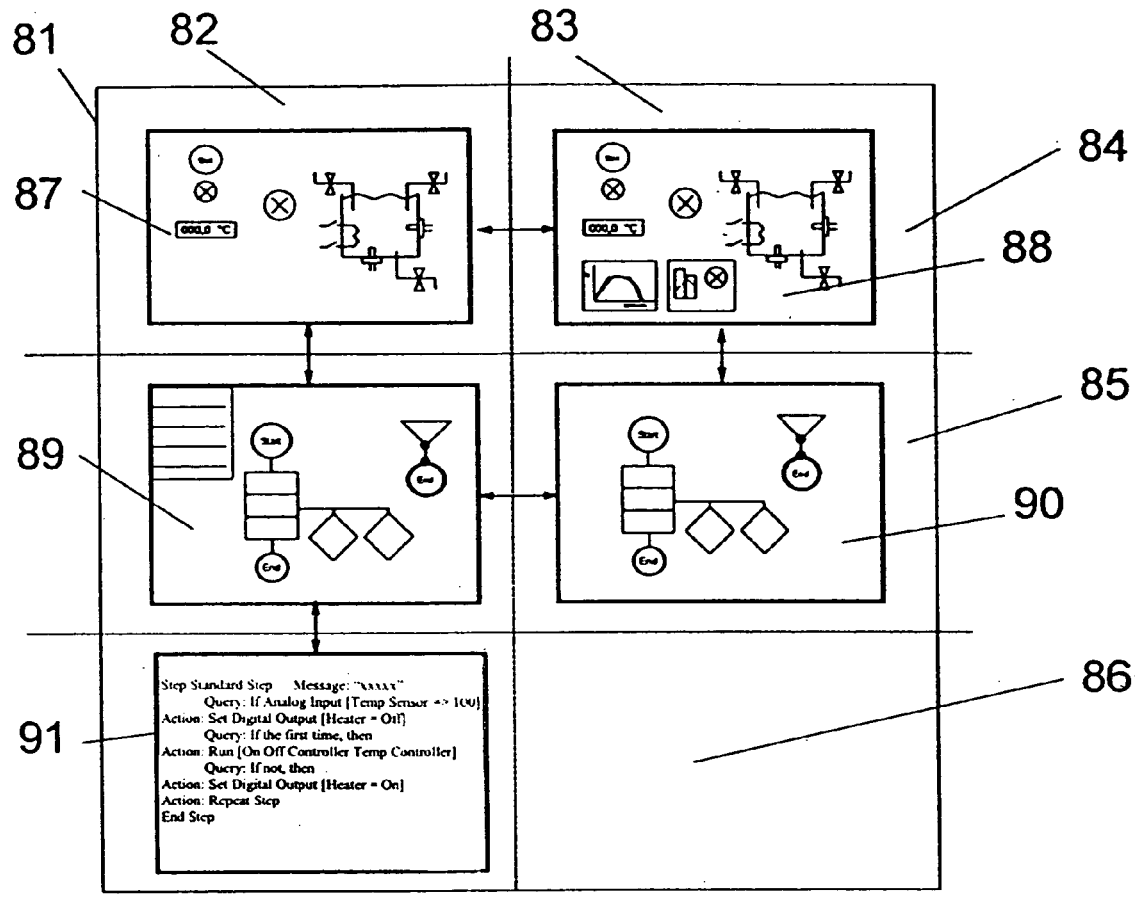
FIG. 9 shows the screens of an automation module.

In FIG. 9, the reference characters have the following meanings. 81 represents the screens of an automation module. 82 are the screens of a development mode (one vertically below another). 83 are the screens of a runtime mode (one vertically below another). 84 is a module operation and observation plane (one horizontally next to another). 85 is a procedure plane (one horizontally next to another). 86 is a script plane, the plane of the automation language (development mode only). 87 is the screen of the development mode of the operation and observation plane. 88 is the screen of the runtime mode of the operation and observation plane. 89 is the procedure screen of the development mode of the procedure plane. 90 is the procedure screen of the runtime mode of the procedure plane. 91 is the script screen of the automation language in development mode.

The automation module 81 is the core of the entire system. It makes available a number of distinct screens that enable users to develop automation solutions in the development mode 82 and that permits the user to operate and observe processes in the runtime mode 83. The upper plane, called modular operation and observation plane 84, includes the screen 87, which serves for the development of the operation and observation plane. The upper plane, modular operation and observation plane 84, further includes the screen 88, which serves as an interface to the user during runtime. Screens 87, 88 contain process visualization objects. These process visualization objects can be installed and provided with properties in the development mode 82. Such process visualization objects are virtual buttons, switches, setpoint devices, indicating devices, trends, characteristic curve plots, bar graphs and much more. With the aid of these objects, the user can operate and observe the processes at runtime 83.

The middle plane, called procedure plane 85, contains procedure screens 89, 90. The procedure screens 89, 90 contain graphical symbols as synonyms for the program modules 91. The modules, which can be regarded as containers for the program code, are set up in the development mode 82. Further, they are connected horizontally and vertically with connecting lines in accordance with set rules. These connecting lines indicate in what internal relationship the individual modules stand to one another. In the runtime mode 83, those modules in the procedure screen 90 are marked that are currently functioning. In this way, a user can gain information about the process sequence. In this way, with the screens 88 and the module screen 90, a user has a permanent way of monitoring the sequence of the process in the runtime mode 83.

The lower plane, called the script plane 86, contains the program code in the script window 91. In the script window 91 a user can develop the automation program for controlling the underlying technical process.

The program code is developed in a procedure-based fashion. When one of the symbolic figures in the module screen 89 is clicked on, the script window opens with the program code of the procedure that was clicked on; now the program code can be developed in the script window 91.

Figure 10:
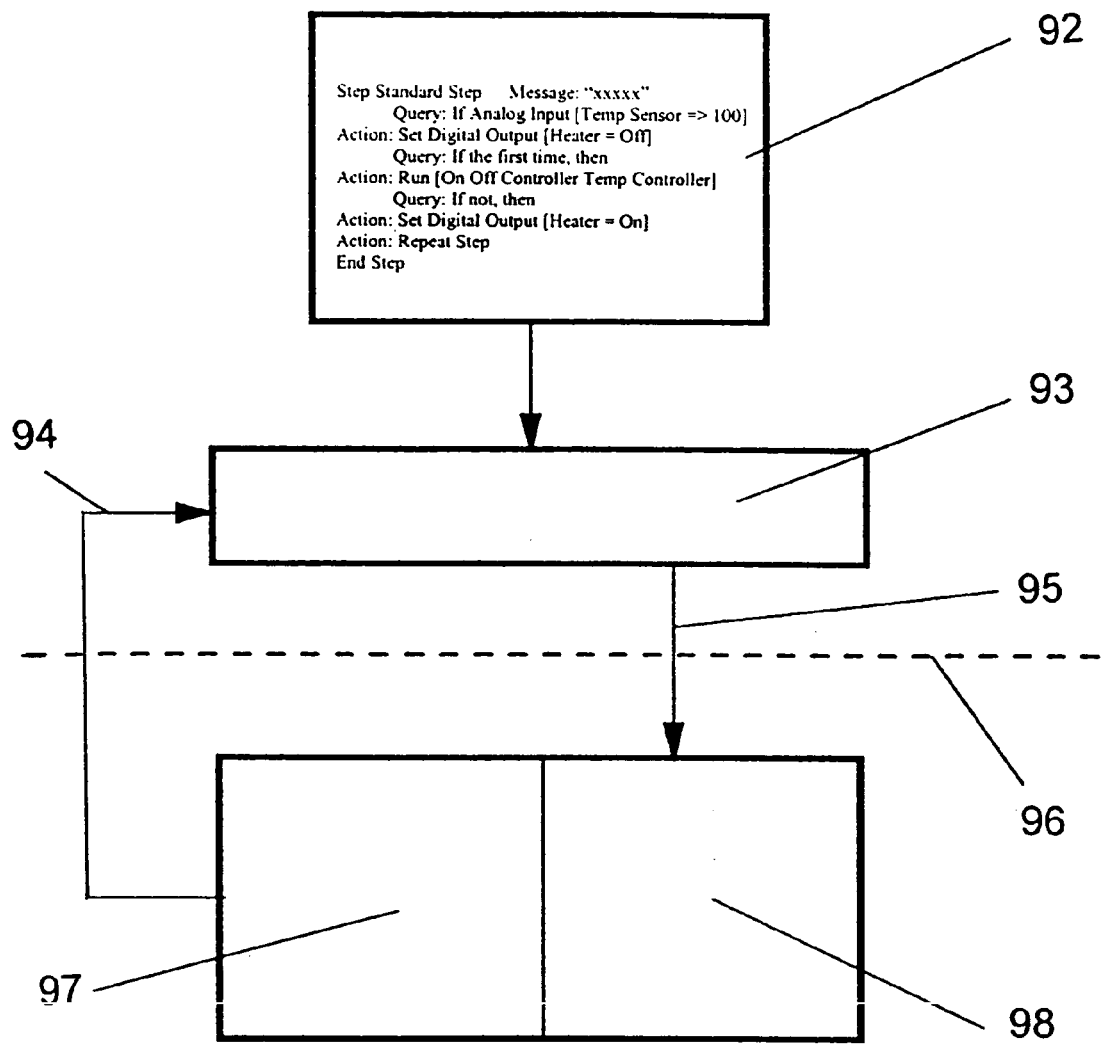
FIG. 10 shows the block diagram of a format table as linking element between the automation module and the report.

In FIG. 10, the reference characters have the following meanings. 92 is a the program code of an automation module. 93 is a format table. 94 is a data path to the configuration of the format table. 95 is a data path for data that are to be output in the report. 96 is the separation between the automation module (above) and the report (below). 97 is the development mode of the report. 98 is the runtime mode of the report. The format table 93 serves as data interface between an automation module and its corresponding report 97, 98. A report is made up of the two parts; that is, the development mode 97 and the runtime mode 98. At runtime, data are written into the individual fields of the format table 93 by the program code 92 of an automation module. The report takes data from the format table 93 and writes them into the corresponding fields of the format (report). Such a format can be printed out on a printer. At the beginning of a development phase, the fields of the format and the data that are to be written into the individual fields are unknown. For this reason, the format of the report must be developed first. In the development mode 97 of the report, the report is developed as a format. In this way, the format fields in the report are set up into which the data are to be written during runtime. The report automatically structures the format table 93. When a new field is set up in the format of the report, a corresponding field is automatically set up in the format table. In this way, the fields of the report correlate with the fields of format table 93. The format table 93 is a component of the automation module. The format table 93 is structured via path 94.

The program developer now knows the fields of the format table 93, because they are a component of the automation module. He can now write program code 92 in such a way that the data that are to appear in the report are written into the correct fields of the format table 93 at runtime. These data are then supplied to the runtime mode 98 of the report via the data path 95 and can thus be correctly output in the report 98.

What is claimed is:

1. A system for automation, monitoring and measurement acquisition for a technical process having measurement and control units (2, 14, 15, 16) that are connected to sensors and actuators of the processes (1, 8, 9, 10) via measurement and control lines (3, 11, 12, 13), comprising:

a data network (4) with an automation group (99) having system automation units (18, 19, 20) each of which has its own program code and is executable independently of other of said automation units (18, 19, 20), and system automation modules (44, 45, 46) in said data network (4) combined into automation units (39, 31, 32, 18, 19), each automation module having its own program code and being executable independently of the other automation modules, said data network (4) includes an information level (22) at a higher level than said automation units (18, 19, 20), said information level (22) containing information programs (23, 24, 25, 26, 27) having reading access to said automation units (18, 19, 20) and to said automation modules (44, 45, 46) and wherein said information programs (23, 24, 25, 26, 27) of said information level (22) are configurable to lack access to predetermined automation groups.

2. The system of claim 1 wherein said automation units (31, 32) are structured in a supervisory plane (33, 36), a plane of automation modules (34, 37) and a report plane (35, 38).

3. The system of claim 2 wherein said supervisory plane (33, 36) is designed for the setting up of automation units (18, 19, 20, 31, 32) and automation modules (44, 45, 46) and for the starting and stopping of the automation modules and also displays items of information about the status of the individual automation modules (34, 37).

4. The system of claim 2 wherein said plane of automation modules (34, 37), facilitate development of additional automation modules (44, 45, 46), which are executable independently of one another and each have their own program code.

5. The system of claim 1 wherein a time stamp is appended to analog process variables acquired by said measurement and control unit via sensors.

6. The system of claim 5 wherein said time stamp is appended to the edges of digital signals.

7. A system for automation, monitoring and measurement acquisition for a technical process having measurement and control units (2, 14, 15, 16) that are connected to sensors and actuators of the processes (1, 8, 9, 10) via measurement and control lines (3, 11, 12, 13), comprising:

a data network (4), and system automation modules (44, 45, 46) in said data network (4) combined into automation units (39, 31, 32, 18, 19), each automation module having its own program code and being executable independently of the other automation modules, said automation units (31, 32) being structured in a supervisory plane (33.36), a plane of automation modules (34, 37) and a report plane (35, 38), and supervisory plane (33, 36) being designated for the setting up of automation units (18, 19, 20, 31, 32) and automation modules (44, 45, 46) and for the starting and stopping of the automation modules and also displays items of information about the status of the individual automation modules (34, 37), said plane of automation modules (34, 37) facilitate development of additional automation modules (44, 45, 46), which are executable independently of one another and each have their own program code and wherein, in said report plane (35, 38, 43), a number of reports (47, 48, 49) can be developed, which are executable independently of one another, each report having available its own program code.

8. The system of claim 7 wherein a report (47) is allocated to one of said automation modules (44) and said one automation module is data-linked to said report, the data being capable of being output in the format of said report.

9. The system of claim 8 having a supervisory plane (41, 55) including a supervisory program (40, 54) having a development mode (66) and a runtime mode (67), and wherein a development mode (68) and a runtime mode (69) is allocated to each of said automation modules (44, 45, 46) of a plane of automation modules (42), and each report (47, 48, 49) of said report plane (43, 57, 65) has available a development mode (70) and a runtime mode (71).

10. The system of claim 9 having automation modules (44, 45, 46, 58, 59, 81) structured in three planes (84, 85, 86), with a modular operation and observation plane (84) that contains diagrams (87, 88) with process visualization objects, a procedure plane (85) with procedure screens (89, 90) that contain graphical symbols as synonyms for program modules (91), and a script plane (86) in which a program code (91) is contained.

11. The system of claim 10 including a channel table (53) having fields to which said measurement and control units (2, 14, 15, 16) and the automation modules of the automation units (18, 19, 20) are readingly and writingly connected for transmission of data.

12. The system of claim 11 wherein said individual automation units (81) contain a procedure screen (90) in a runtime mode (83), said procedure screen (90) having interconnected symbolic figures that represent identification features of said procedure modules, and symbolic figures that are currently functioning in said runtime mode.

13. The system of claim 11 wherein said automation units (18, 19, 20), automation modules (44, 45, 46), reports (47, 48, 49), visualization objects of the screens (87, 88) and software modules (91) are uniquely named.

14. The system of claim 11 including a format table (93) structured by a development mode (97) of a report, said format table (93) being writingly in effective connection with the program of an automation module (92) in runtime mode, said data being capable of being output in a format in the runtime mode (98) of said report.

* * * * *